(12) United States Patent
Sawai (10) Patent No.: US 11,485,223 B2
(45) Date of Patent: Nov. 1, 2022

(54) HIGH-PRESSURE VESSEL MOUNTING STRUCTURE

(71) Applicant: TOYOTA JIDOSHA KABUSHIKI KAISHA, Aichi-ken (JP)

(72) Inventor: Osamu Sawai, Okazaki (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 34 days.

(21) Appl. No.: 17/086,461

(22) Filed: Nov. 2, 2020

(65) Prior Publication Data
US 2021/0237562 A1    Aug. 5, 2021

(30) Foreign Application Priority Data
Feb. 5, 2020    (JP) .............................. JP2020-018102

(51) Int. Cl.
| | | |
|---|---|---|
| *B60K 15/07* | (2006.01) | |
| *F17C 13/08* | (2006.01) | |
| *B60K 15/063* | (2006.01) | |
| *B60K 15/03* | (2006.01) | |

(52) U.S. Cl.
CPC .............. *B60K 15/07* (2013.01); *F17C 13/08* (2013.01); *B60K 2015/03315* (2013.01); *B60K 2015/0634* (2013.01)

(58) Field of Classification Search
CPC .......... B60K 15/07; B60K 2015/03315; B60K 2015/0634; F17C 13/08
USPC ...................................................... 180/271
See application file for complete search history.

(56) References Cited

U.S. PATENT DOCUMENTS

| | | | |
|---|---|---|---|
| 7,270,209 B2 * | 9/2007 | Suess ............... | B60K 15/03006 224/538 |
| 10,850,611 B2 * | 12/2020 | Buchholz ......... | B60K 15/03006 |
| 2019/0047409 A1 * | 2/2019 | Kataoka ................... | F17C 1/14 |
| 2019/0047411 A1 * | 2/2019 | Kataoka ............... | F17C 13/084 |
| 2019/0047633 A1 * | 2/2019 | Sawai ............... | B62D 25/2009 |

FOREIGN PATENT DOCUMENTS

| | | | | |
|---|---|---|---|---|
| CN | 109084171 A | * | 12/2018 | ................ F17C 1/12 |
| DE | 102014017628 A1 | * | 6/2015 | ........... B60K 15/063 |
| DE | 102017210720 A1 | * | 12/2018 | |
| JP | 2011226608 A | | 11/2011 | |
| JP | 201932055 A | | 2/2019 | |
| KR | 20200041674 A | * | 4/2020 | |
| WO | WO-2015176177 A1 | * | 11/2015 | ................ F17C 3/08 |

* cited by examiner

*Primary Examiner* — Mahmoud Gimie
(74) *Attorney, Agent, or Firm* — Hauptman Ham, LLP (57) ABSTRACT

A high-pressure vessel mounting structure includes: a plurality of high-pressure vessels arranged on the upper surface of a bottom wall in a front-rear direction of a vehicle body with a vehicle width direction as an axial direction; a plurality of load transmission members each provided between the high-pressure vessels on the bottom wall and extending along the axial direction; a connection member that connects one axial end of each of the high-pressure vessels; and a support member that supports the other axial end of each of the high-pressure vessels, and the support member can move relatively inward in the vehicle width direction with respect to the high-pressure vessel when a load is input from outside in the vehicle width direction.

1 Claim, 8 Drawing Sheets

HIGH-PRESSURE VESSEL MOUNTING STRUCTURE

CROSS-REFERENCE TO RELATED APPLICATION

This application claims priority to Japanese Patent Application No. 2020-018102 filed on Feb. 5, 2020, incorporated herein by reference in its entirety.

BACKGROUND

1. Technical Field

The disclosure relates to a high-pressure vessel mounting structure.

2. Description of Related Art

A fuel cell vehicle equipped with a plurality of hydrogen tanks has been known (e.g., see Japanese Patent Application Publication No. 2019-32055). The hydrogen tanks mounted on the fuel cell vehicle are arranged in a vehicle width direction, with a front-rear direction of a vehicle body as an axial direction, and are accommodated in a case.

SUMMARY

However, in the fuel cell vehicle having the above configuration, when a load is input from outside in the vehicle width direction due to a side collision or the like, there is a possibility that the load is input to the hydrogen tank through the case. That is, there is still room for improvement in a structure capable of reducing an input of a load to a high-pressure vessel when the load is input to a vehicle mounted with the high-pressure vessel such as a hydrogen tank, from outside in the vehicle width direction.

Accordingly, it is an object of the disclosure to obtain a high-pressure vessel mounting structure capable of reducing an input of a load to a high-pressure vessel even when the load is input to a vehicle mounted with the high-pressure vessel, from outside in the vehicle width direction.

For achieving the above object, a high-pressure vessel mounting structure includes: a plurality of high-pressure vessels arranged on an upper surface of a bottom wall in a front-rear direction of a vehicle body with a vehicle width direction as an axial direction; a plurality of load transmission members each provided between the high-pressure vessels on the bottom wall and extending along the axial direction; a connection member that connects one axial end of each of the high-pressure vessels; and a support member that supports the other axial end of each of the high-pressure vessels, and the support member can move relatively inward in the vehicle width direction with respect to the high-pressure vessel when a load is input from outside in the vehicle width direction.

According to at least one embodiment, when a load is input from outside in the vehicle width direction, the support member for supporting the other axial end of the high-pressure vessel moves relatively inward in the vehicle width direction with respect to the high-pressure vessel. Therefore, the load input from outside in the vehicle width direction is transmitted and dispersed from the connection member or the support member to the load transmission member and is hardly transmitted to the high-pressure vessel. That is, according to the disclosure, even when a load is input from outside in the vehicle width direction to a vehicle mounted with the high-pressure vessel, the input of the load to the high-pressure vessel is reduced.

A high-pressure vessel mounting structure is the high-pressure vessel mounting structure according to at least one embodiment, in which the support member holds the outer peripheral surface of a rubber member fitted to the other axial end of the high-pressure vessel.

According to at least one embodiment, the outer peripheral surface of the rubber member fitted to the other axial end of the high-pressure vessel is held by the support member. Therefore, when a load is input from outside in the vehicle width direction, the support member can move relatively inward in the vehicle width direction with respect to the high-pressure vessel due to elastic deformation of the rubber member.

A high-pressure vessel mounting structure is the high-pressure vessel mounting structure according to at least one embodiment, in which the support member holds a tubular member made of resin to which the other axial end of the high-pressure vessel is fitted slidably.

According to at least one embodiment, a tubular member made of resin to which the other axial end of the high-pressure vessel is slidably fitted is held by the support member. Therefore, when a load is input from outside in the vehicle width direction, the tubular member slides relatively with respect to the other axial end of the high-pressure vessel, so that the support member can move relatively inward in the vehicle width direction with respect to the high-pressure vessel.

A high-pressure vessel mounting structure is the high-pressure vessel mounting structure according to at least one embodiment, in which the support member holds a coil spring that energizes the high-pressure vessel toward the connection member.

According to at least one embodiment, a coil spring for energizing the high-pressure vessel toward the connection member is held by the support member. Therefore, when a load is input from outside in the vehicle width direction, the support member can move relatively inward in the vehicle width direction with respect to the high-pressure vessel due to elastic deformation of the coil spring.

A high-pressure vessel mounting structure is the high-pressure vessel mounting structure according to at least one embodiment, in which the support member is held by a vehicle body constituting member via an elastic body.

According to at least one embodiment, the support member is held by the vehicle body constituting member via the elastic body. Therefore, when a load is input from outside in the vehicle width direction, the support member can move relatively inward in the vehicle width direction with respect to the high-pressure vessel due to elastic deformation of the elastic body.

As described above, according to the disclosure, even when a load is input from outside in the vehicle width direction to the vehicle mounted with the high-pressure vessel, the input of the load to the high-pressure vessel can be reduced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the disclosure will be described in detail with reference to the drawings. For the convenience of description, arrows UP, FR, and LH, appropriately drawn in each drawing indicate an upward direction of a vehicle body, a front direction of the vehicle body, and a left-hand direction of the vehicle, respectively. Hence in the following description, when directions of up and down, front and rear, and right and left are described without special note, these represent up and down in a height direction of the vehicle body, front and rear in a front-rear direction of the vehicle body, and right and left in a right-left direction (vehicle width direction) of the vehicle body.

First Embodiment

Figure 1:
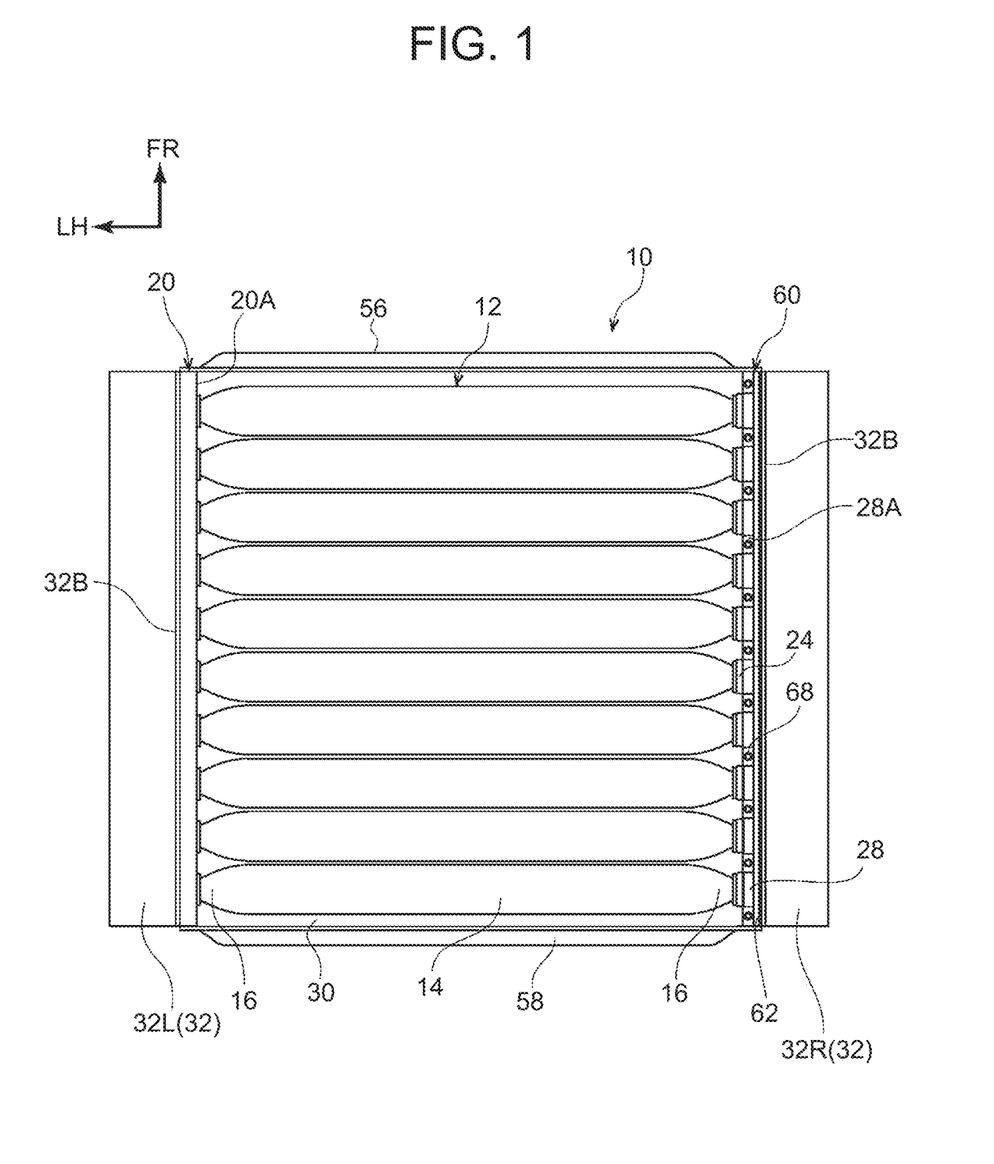
FIG. 1 is a plan view illustrating a high-pressure vessel mounting structure according to a first embodiment.
Figure 2:
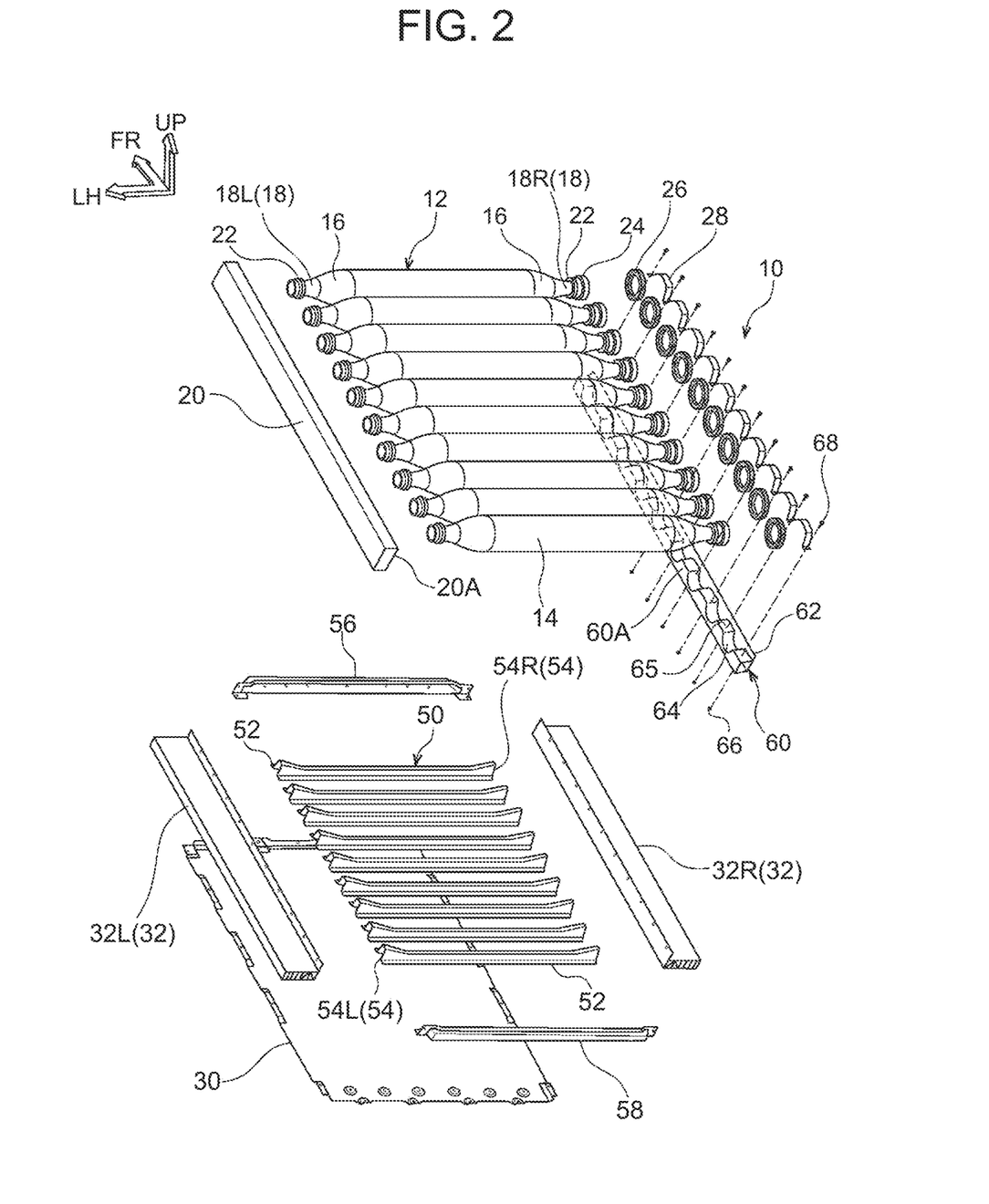
FIG. 2 is an exploded perspective view illustrating the high-pressure vessel mounting structure according to the first embodiment.

First, a high-pressure vessel mounting structure 10 according to a first embodiment will be described. As illustrated in FIGS. 1 and 2, a plurality of (10 pieces in the illustration) high-pressure vessels 12 constituting the high-pressure vessel mounting structure 10 each have a body portion 14 formed in a substantially cylindrical shape and substantially hemispherical dome portions 16 integrally provided at both axial ends of the body portion 14. Each high-pressure vessel 12 has a cylindrical opening tubular portion 18 at an axial center of each dome portion 16.

Note that the high-pressure vessel 12 is made of, for example, carbon fiber reinforced resin (CFRP) and is filled with hydrogen serving as a fuel. The high-pressure vessels 12 are each accommodated on a lower side of a floor panel (not illustrated) constituting a floor surface of a vehicle (not illustrated) and are arranged on an upper surface of an undercover 30 serving as a bottom wall in a front-rear direction with a vehicle width direction as an axial direction.

Figure 3:
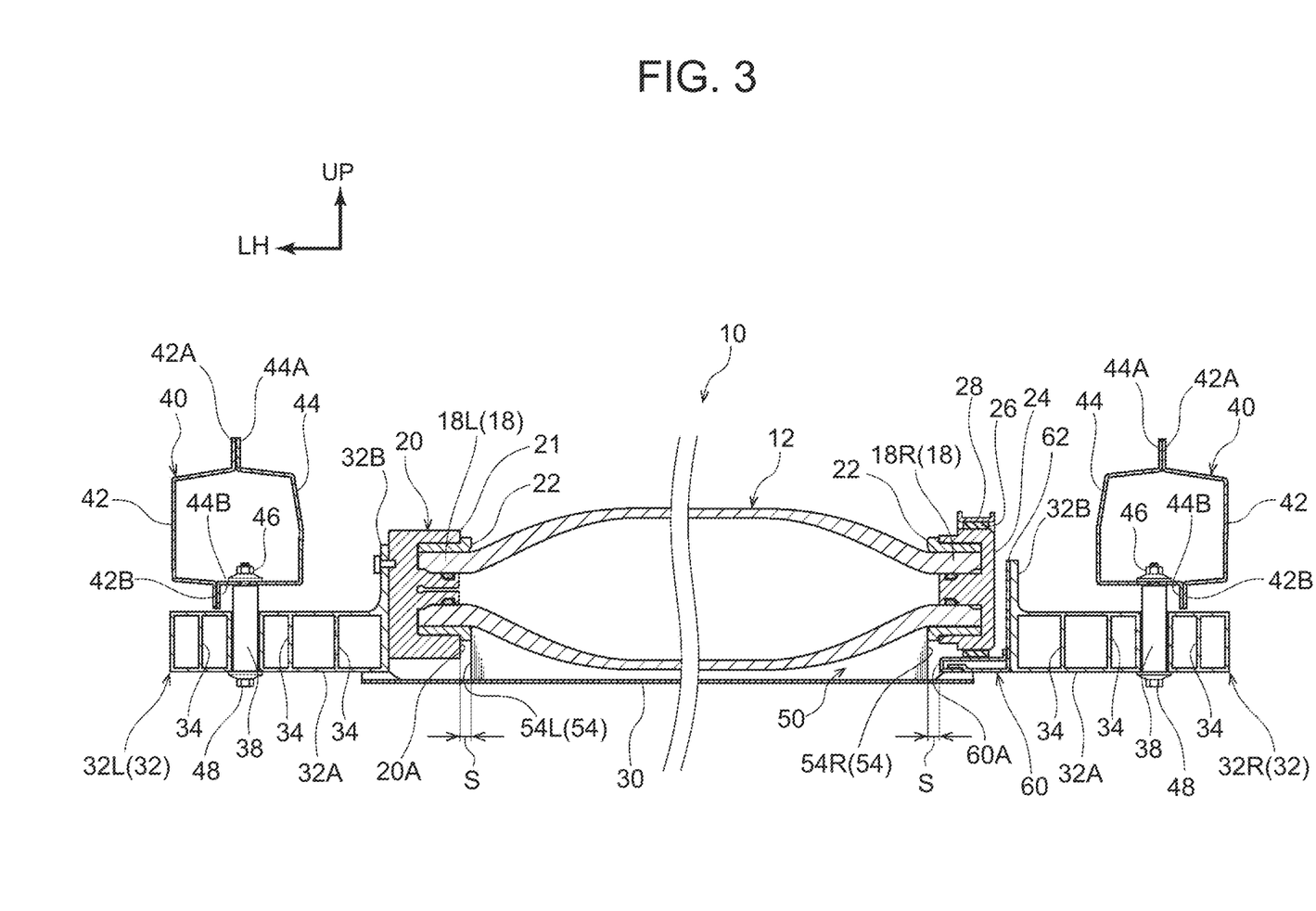
FIG. 3 is a front view illustrating the high-pressure vessel mounting structure according to the first embodiment.

Both ends of the undercover 30 in the vehicle width direction are fixed to a pair of right and left energy-absorbing members 32 serving as a vehicle body constituting member by fixing means such as bolt-fastening. The energy-absorbing member 32 is formed in a rectangular closed sectional shape, with the vehicle width direction as a longitudinal direction, and extends in the front-rear direction. As illustrated in FIG. 3, a plurality of vertical walls 34 along the height direction are integrally formed in the closed section of the energy-absorbing member 32 at predetermined intervals in the vehicle width direction.

The pair of right and left energy-absorbing members 32 are fixed to lower walls of a pair of right and left rockers 40 (inner panel 44 to be described later) by fixing means such as bolt-fastening. The rocker 40 has an outer panel 42 and the inner panel 44 in a hat-shaped sectional shape, and upper flanges 42A, 44A and lower flanges 42B, 44B are joined together to form a closed sectional shape.

A plurality of through-holes (not illustrated) are formed in a lower wall of the inner panel 44 at predetermined intervals in the front-rear direction, and a weld nut 46 is fixed to an upper surface of each inner panel 44 coaxially. A plurality of through-holes (not illustrated) are also formed in the energy-absorbing member 32 at predetermined intervals in the front-rear direction, and a cylindrical collar member 38 having a length larger than a combined length of a height of the energy-absorbing member 32 and vertical lengths of the lower flanges 42B, 44B in the height direction is inserted in each through-hole.

Therefore, a plurality of bolts 48 are inserted into the through-holes of the collar members 38 and the through-holes formed in the lower wall of the inner panel 44 from below, and the bolts 48 are screwed to the respective weld nuts 46, whereby the energy-absorbing member 32 is attached to the lower wall of the rocker 40 (inner panel 44).

As illustrated in FIG. 2, on the upper surface of the undercover 30 and at positions (clearances) each between the high-pressure vessels 12, there are provided a plurality of reinforcements 50 as load transmission members extending in the vehicle width direction (the axial direction of the high-pressure vessel 12). Each reinforcement 50 is formed in a hat-shaped sectional shape, and each flange 52 is joined to the upper surface of the undercover 30 by joining means such as welding, thereby forming a closed sectional shape with the undercover 30.

As illustrated in FIG. 3, a length of each reinforcement 50 is substantially the same as a length of the high-pressure vessel 12 except for the opening tubular portion 18. Thus, a small gap S is formed between an outer end face 54 of each reinforcement 50 in the vehicle width direction and an inside wall surface (hereinafter referred to as "inner wall surface") 20A of a manifold 20 to be described later in the vehicle width direction, and between the outer end face 54 and an inside wall surface (hereinafter referred to as "inner wall surface") 60A of a support member 60 in the vehicle width direction.

As shown in FIGS. 1 and 2, a front frame 56 and a rear frame 58 are fixed to a front end and a rear end of the undercover 30, respectively, by fixing means such as bolt-fastening. As a result, the body portion 14 of the high-pressure vessel 12 disposed at a foremost and the body portion 14 of the high-pressure vessel 12 disposed at a rearmost are protected against a load input from the front and a load input from the rear, respectively.

As illustrated in FIGS. 1 to 3, a mouthpiece 22 is attached to each opening tubular portion 18L serving as one axial end (left end) of each high-pressure vessel 12, and each mouthpiece 22 is connected by the manifold 20 serving as a connection member. The manifold 20 is formed in a rectangular sectional shape with a length in the height direction larger than a length in the vehicle width direction and extends in the front-rear direction. The manifold 20 is fixed to a vertical wall portion 32B erected at an inner end of a left energy-absorbing member 32L in the vehicle width direction by fixing means such as bolt-fastening.

Each mouthpiece 22 attached to the opening tubular portion 18L of each high-pressure vessel 12 is rigidly fitted and attached to a fitting portion 21 formed in an inner wall portion of the manifold 20 in the vehicle width direction, and a flow passage (not illustrated) through which gas (hydrogen) can flow is formed inside the manifold 20. As a result, hydrogen as fuel filling each high-pressure vessel 12 can be supplied from the manifold 20 to a fuel cell unit (not illustrated).

An opening tubular portion 18R as the other axial end (right end) of each high-pressure vessel 12 is supported by the support member 60. The support member 60 has a rectangular flat sidewall 62 extending in the front-rear direction, and the sidewall 62 is fixed to the vertical wall portion 32B erected on an inner end of a right energy-absorbing member 32R in the vehicle width direction by fixing means such as bolt-fastening.

The mouthpiece 22 is attached to each opening tubular portion 18R of each high-pressure vessel 12, and a cap 24 having a circular shape in a side view is screwed to and attached to each mouthpiece 22. An annular cushion rubber 26 as a rubber member is fitted to an outer peripheral surface of each cap 24. That is, an inner diameter of the cushion rubber 26 is formed slightly smaller than an outer diameter of the cap 24, and the cushion rubber 26 is attached to the outer peripheral surface of the cap 24 in an elastically deformed state.

On an inner side of the sidewall 62 of the support member 60 in the vehicle width direction, a plurality of recesses 64, having a substantially semicircular arc-shape in a side view and supporting outer peripheral surfaces of the respective cushion rubbers 26 from below, are formed at predetermined intervals (at equal intervals) in the front-rear direction. Note that the inner wall surface in the vehicle width direction forming the recess 64 is an inner wall surface 60A.

A plurality of strap bands 28 each having a substantially semicircular arc-shape in a side view as pressing tools for pressing the outer peripheral surfaces of the respective cushion rubber 26 from above are integrally connected by a flat connection portion 28A. The connection portion 28A is attached to an upper surface 65 of the support member 60 between the recesses 64 by fastening means with bolts 68 and nuts 66 (see also FIG. 4).

Figure 4:
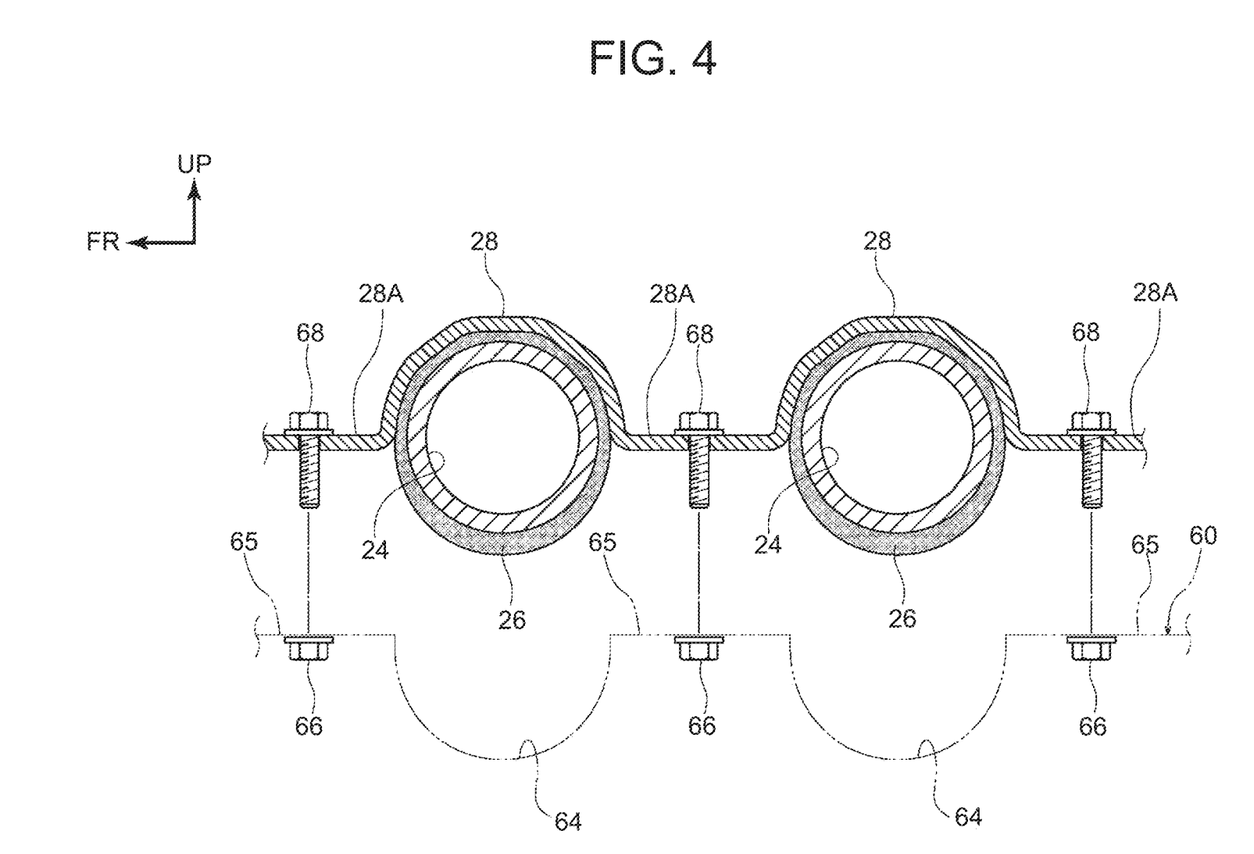
FIG. 4 is an enlarged side view of a part of the high-pressure vessel mounting structure according to the first embodiment.
Figure 5:
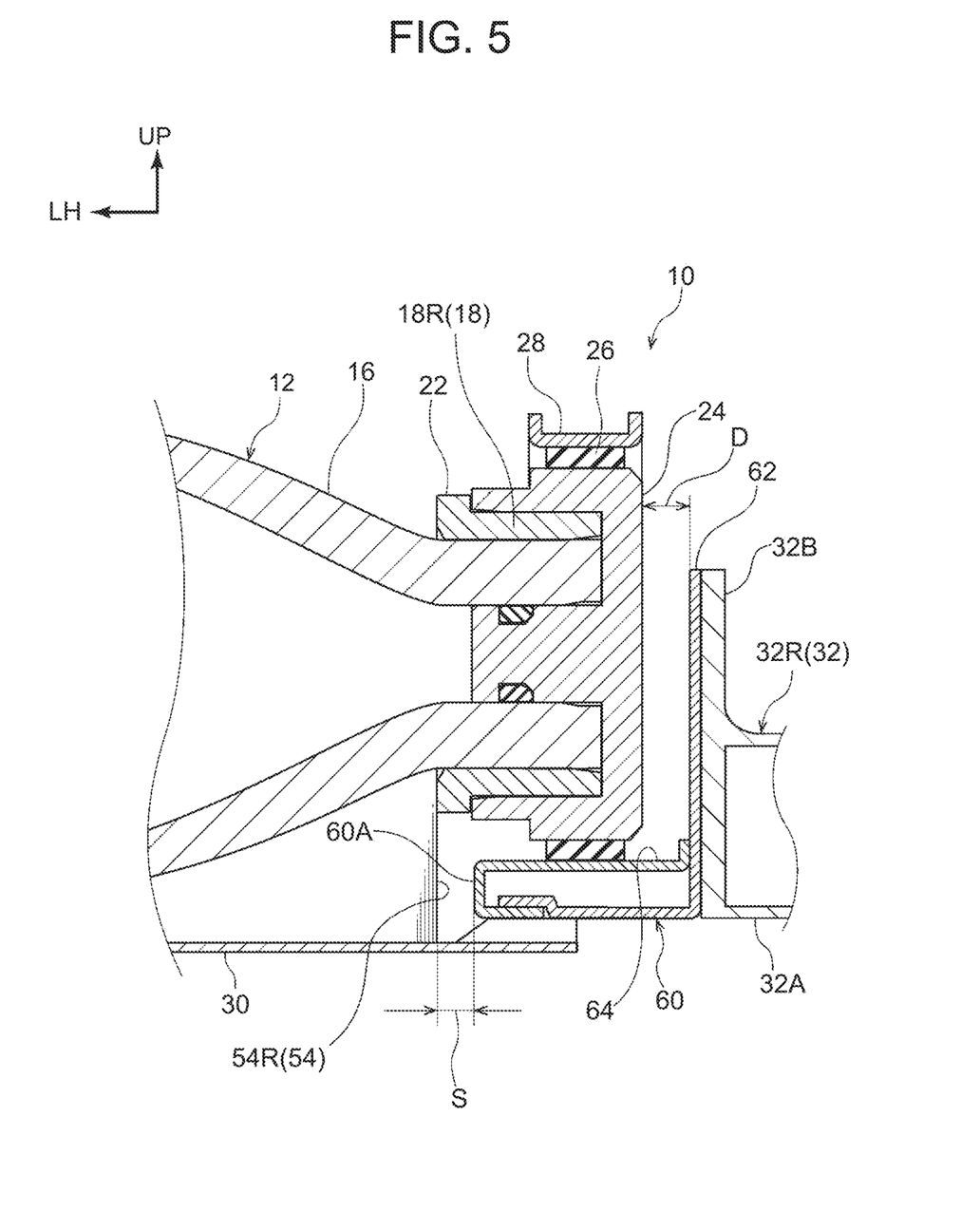
FIG. 5 is an enlarged front view of a part of the high-pressure vessel mounting structure according to the first embodiment.

Therefore, as illustrated in FIGS. 4 and 5, the outer peripheral surface of each cushion rubber 26 is sandwiched between the strap band 28 and the recess 64 of the support member 60 in the height direction and held by the support member 60 (the support member 60 holds the outer peripheral surface of the cushion rubber 26).

Thereby, due to the axial elastic deformation of the cushion rubbers 26 in the axial direction, each high-pressure vessel 12 can move in the axial direction (rightward). In other words, due to the elastic deformation of the cushion rubbers 26 in the axial direction, the support member 60 can move (relatively) in the axial direction (leftward).

Note that a distance (degree of freedom) by which the high-pressure vessels 12 and the support members 60 can move (slide) in the axial direction is insignificant (slightly larger than the gap S) because the distance is within the elastically deformable range of each cushion rubbers 26. A gap D (see FIG. 5) between the sidewall 62 of the support member 60 and the cap 24 is slightly larger than the gap S so as to allow the movement of the support member. Each high-pressure vessel 12 and the support members 60 are also movable in a direction orthogonal to the axial direction within the elastically deformable range of the cushion rubbers 26.

Next, an action of the high-pressure vessel mounting structure 10 according to the first embodiment configured as described above will be described.

For example, when a left sidewall of the vehicle collides and a collision load is input from the left, the left energy-absorbing member 32L moves inward in the vehicle width direction while being deformed inward in the vehicle width direction (while absorbing energy). Then, the manifold 20 fixed to the energy-absorbing member 32L moves (slides) inward in the vehicle width direction.

More specifically, the outer peripheral surface of the cushion rubber 26 fitted to the outer peripheral surface of the cap 24 is sandwiched between the strap band 28 and the recess 64 of the support member 60, whereby the cap 24 attached to the opening tubular portion 18R, which is the right end of each high-pressure vessel 12, via the mouthpiece 22 is held only by the support member 60.

Hence, the high-pressure vessels 12 can move slightly rightward due to the elastic deformation of the cushion rubbers 26. In other words, the support member 60 can move relatively slightly leftward (inward in the vehicle width direction) with respect to each high-pressure vessel 12 due to the elastic deformation of each cushion rubbers 26.

Accordingly, when a collision load is input from the left, the manifold 20 can move inward in the vehicle width direction (rightward) together with the left energy-absorbing member 32L, and the inner wall surface 20A of the manifold 20 can be brought into contact with an outer end face (left end face) 54L of each reinforcement 50 in the vehicle width direction.

Thereby, the collision load is efficiently transmitted from the manifold 20 to each reinforcement 50 and dispersed, so that the transmission of the collision load to each high-pressure vessel 12 can be made difficult. As described above, according to the first embodiment, even when a load is input from the left (outside in the vehicle width direction) to the vehicle mounted with the high-pressure vessel 12, the input of the load to the high-pressure vessel 12 can be reduced (minimized).

Note that the same applies to a case where a right sidewall of the vehicle collides. More specifically, when the right sidewall of the vehicle collides and a collision load is input from the right, the right energy-absorbing member 32R moves inward in the vehicle width direction while being deformed inward in the vehicle width direction (while absorbing energy). Then, the support member 60 fixed to the energy-absorbing member 32R moves (slides) inward in the vehicle width direction.

That is, the support member 60 can move slightly leftward (inward in the vehicle width direction) due to the elastic deformation of each cushion rubbers 26. Accordingly, when a collision load is input from the right, the support member 60 can move inward in the vehicle width direction (leftward) together with the right energy-absorbing member 32R, and the inner wall surface 60A of the support member 60 can be brought into contact with an outer end face (right end face) 54R of each reinforcement 50 in the vehicle width direction.

As a result, the collision load is efficiently transmitted from the support member 60 to each reinforcement 50 and dispersed, so that the transmission of the collision load to each high-pressure vessel 12 can be made difficult. As described above, according to the first embodiment, even when a load is input from the right (outward in the vehicle width direction) to the vehicle mounted with the high-pressure vessel 12, the input of the load to the high-pressure vessel 12 can be reduced (minimized).

With the configuration as thus described, it is not necessary to provide a reinforcing member (not illustrated) dealing with a side collision or form a large gap between the left energy-absorbing member 32L and the manifold 20 and between the right energy-absorbing member 32R and the support member 60, and hence a total length of the high-pressure vessel 12 can be maximized. That is, as compared to a configuration with such a need, it is possible to increase an amount of hydrogen as fuel on board.

Further, in the first embodiment, the strap band 28 is attached to the cushion rubber 26 fitted to the cap 24 of each high-pressure vessel 12. Hence, there is no risk of damage to the body portion 14 of each high-pressure vessel 12 as compared to a configuration in which a strap band (not illustrated) is attached to the body portion 14 of each high-pressure vessel. Further, with no strap band being attached to the body portion 14, the space between the high-pressure vessels 12 can be minimized. It is thus possible to increase the number of high-pressure vessels 12, that is, the amount of hydrogen as fuel on board Second Embodiment Next, a high-pressure vessel mounting structure 10 according to a second embodiment will be described. Note that equivalent parts to those in the first embodiment will be denoted by the same numerals, and detailed description (including a common action) will be omitted as appropriate.

Figure 6:
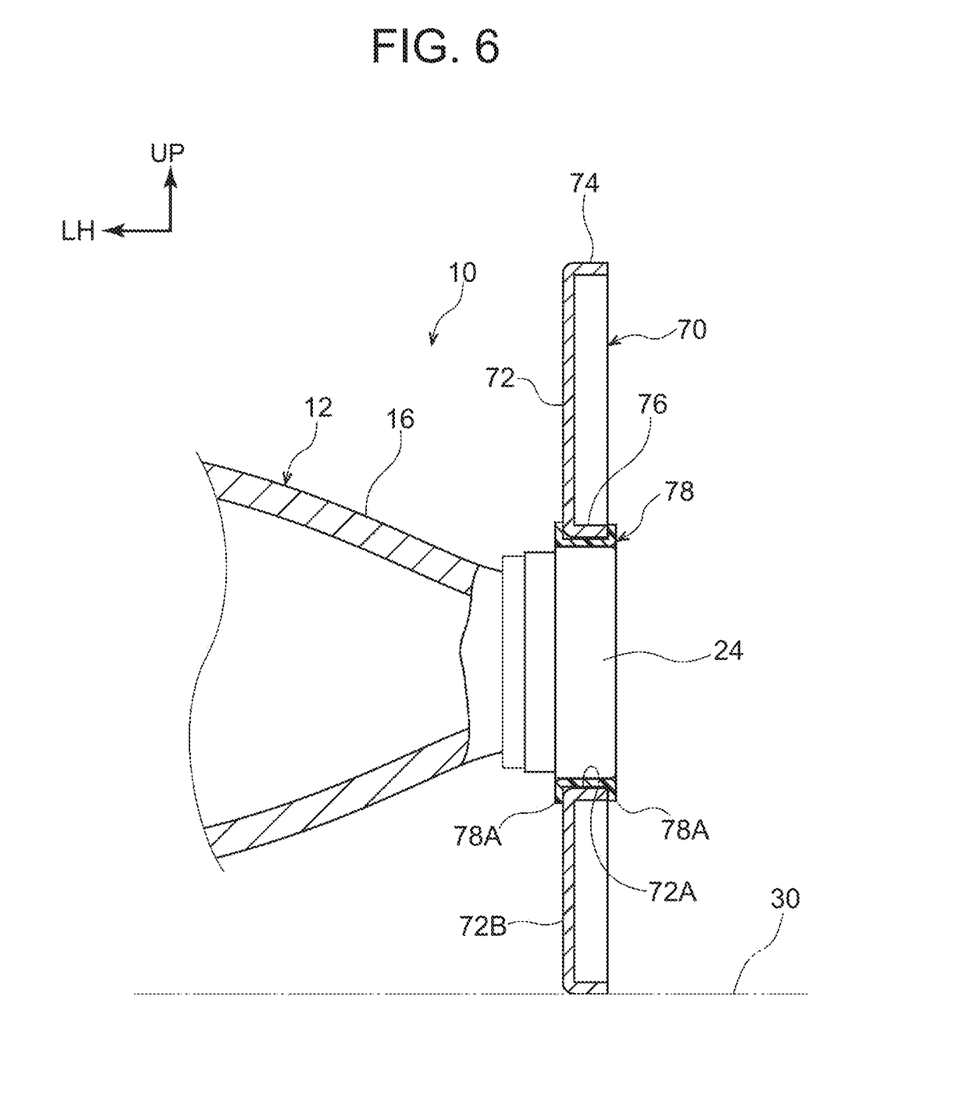
FIG. 6 is a schematic view corresponding to FIG. 5, illustrating a high-pressure vessel mounting structure according to a second embodiment.

As illustrated in FIG. 6, a support member 70 according to the second embodiment is made up of a substantially flat sidewall 72 and a peripheral wall 74 integrally erected around the sidewall 72 outward in the vehicle width direction and is fixed to the right energy-absorbing member 32R (see FIG. 5) by fixing means such as bolt-fastening. A plurality of circular through-holes 72A are formed in the front-rear direction at appropriate positions of the sidewalls 72, and a cylindrical portion 76 having the same height as the peripheral wall 74 is integrally erected around each through-hole 72A outward in the vehicle width direction.

A cylindrical member 78 as a tubular member made of resin is inserted into and attached to each cylindrical portion 76 (each through-hole 72A). At each axial end of each cylindrical member 78, a diameter-enlarged portion 78A protruding radially outward is integrally formed, and each cylindrical member 78 is held immovably by the cylindrical portion 76 formed on the sidewall 72 (the support member 70 holds each cylindrical member 78 immovably.).

The cap 24 provided at the right end of each high-pressure vessel 12 is fitted to each cylindrical member 78 slidably in the axial direction. For this reason, when a collision load is input from the left, each high-pressure vessel 12 (cap 24) can move (slide) rightward with respect to the support member 70. In other words, the support member 70 can move (slide) relatively leftward with respect to each high-pressure vessel 12 (cap 24).

Accordingly, when a collision load is input from the left, the manifold 20 can move inward in the vehicle width direction (rightward) together with the left energy-absorbing member 32L, and the inner wall surface 20A of the manifold 20 can be brought into contact with an outer end face (left end face) 54L of each reinforcement 50 in the vehicle width direction.

When a collision load is input from the right, the support member 70 can move (slide) leftward with respect to each high-pressure vessel 12 (cap 24). Accordingly, when a collision load is input from the right, the support member 70 can move inward in the vehicle width direction (leftward) together with the right energy-absorbing member 32R, and a lower inner wall surface 72B on the sidewall 72 of the support member 70 can be brought into contact with the outer end face (right end face) 54R of each reinforcement 50 in the vehicle width direction.

Third Embodiment

Next, a high-pressure vessel mounting structure 10 according to a third embodiment will be described. Note that equivalent parts to those in the first embodiment will be denoted by the same numerals, and detailed description (including a common action) will be omitted as appropriate.

Figure 7:
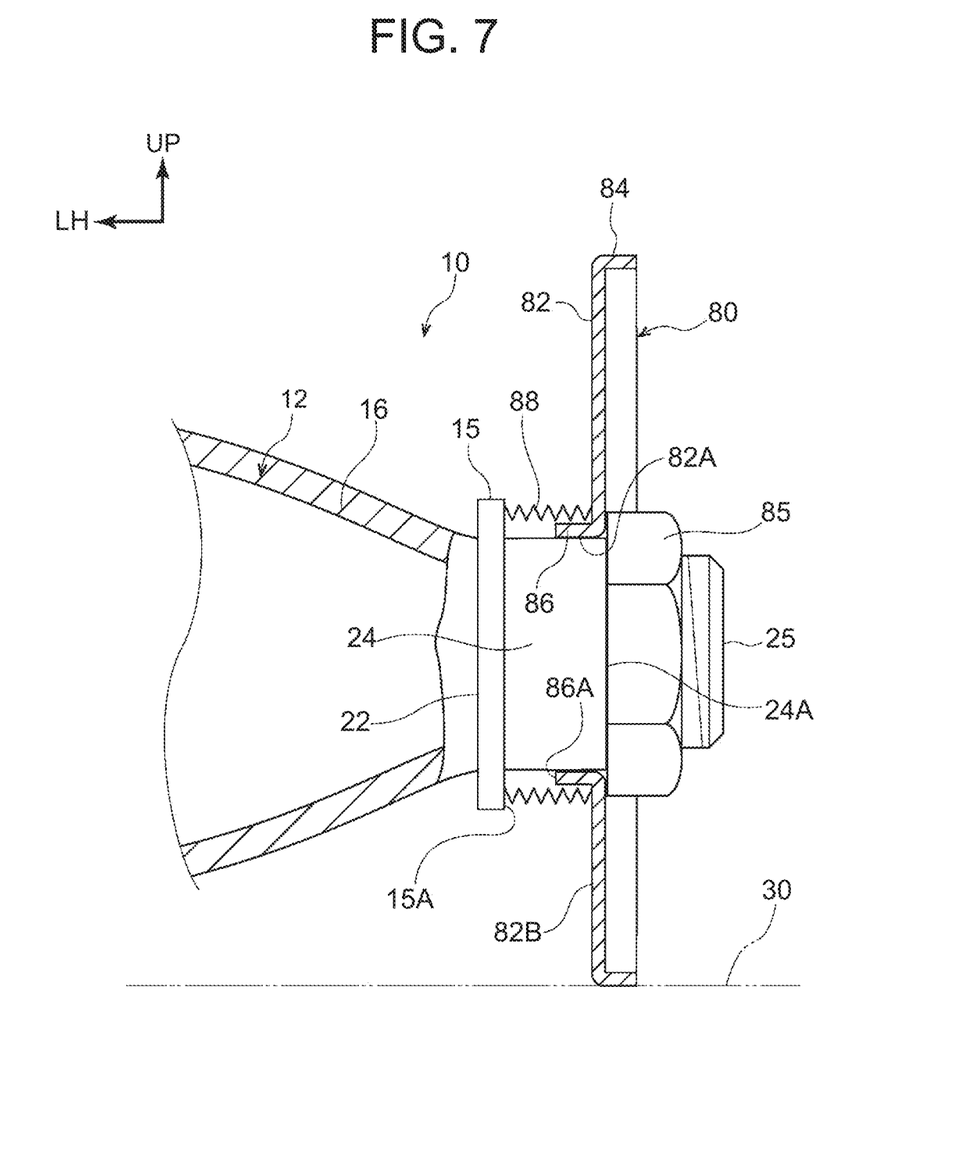
FIG. 7 is a schematic view corresponding to FIG. 5, illustrating a high-pressure vessel mounting structure according to a third embodiment.

As illustrated in FIG. 7, a support member 80 according to the third embodiment is made up of a substantially flat sidewall 82 and a peripheral wall 84 integrally erected around the sidewall 82 outward in the vehicle width direction and is fixed to the right energy-absorbing member 32R (see FIG. 5) by fixing means such as bolt-fastening. A plurality of circular through-holes 82A are formed in the front-rear direction at appropriate positions of the sidewalls 82, and a cylindrical portion 86 having a predetermined height is integrally erected around each through-hole 82A inward in the vehicle width direction.

Meanwhile, a flange 15 as a diameter-enlarged portion is integrally and coaxially formed on an axial inside (inside in the vehicle width direction) of the mouthpiece 22 provided at the right end of each high-pressure vessel 12. A male screw portion 25 projecting outward in the axial direction (outward in the vehicle width direction) is integrally and coaxially formed on an outer surface 24A of the cap 24 screwed to each mouthpiece 22, and a nut 85 as a stopper having an outer diameter larger than an inner diameter of the through-hole 82A is screwed to each male screw portion 25.

Further, each cap 24 is fitted with a coil spring 88 having a clearance in the radial direction, and one end (axially inner end) of each coil spring 88 is in contact with a wall surface (hereinafter referred to as "outer wall face") 15A of the flange 15 facing outward in the vehicle width direction. The other end (axially outer end) of each coil spring 88 is in contact with an inner wall surface 82B of the sidewall 82 on a radially outside of the cylindrical portion 86.

That is, the coil spring 88 is provided between the outer wall surface 15A of each flange 15 and the inner wall surface 82B of the sidewall 82 in a slightly elastically deformed state (the support member 80 holds the coil spring 88 together with the high-pressure vessel 12), and each high-pressure vessel 12 is always energized toward the manifold 20 side with respect to the support member 80 by an elastic restoring force (energizing force) of the coil springs 88.

For this reason, when a collision load is input from the left, each coil spring 88 is elastically deformed, and each high-pressure vessel 12 can thus move (slide) rightward. In other words, the support member 80 can move (slide) relatively leftward with respect to the high-pressure vessels 12 due to the elastic deformation of the coil springs 88.

Accordingly, when a collision load is input from the left, the manifold 20 can move inward in the vehicle width direction (rightward) together with the left energy-absorbing member 32L, and the inner wall surface 20A of the manifold 20 can be brought into contact with an outer end face (left end face) 54L of each reinforcement 50 in the vehicle width direction.

When a collision load is input from the right, each coil springs 88 is elastically deformed, so that the support member 80 can move (slide) leftward with respect to each high-pressure vessel 12. Accordingly, when a collision load is input from the right, the support member 80 can move inward in the vehicle width direction (leftward) together with the right energy-absorbing member 32R, and the lower inner wall surface 82B on the sidewall 82 of the support member 80 can be brought into contact with the outer end face (right end face) 54R of each reinforcement 50 in the vehicle width direction.

Further, a movable (slidable) distance of each high-pressure vessel 12 or the support member 80 in the third embodiment is a distance until the outer wall surface 15A of the flange 15 and a tip surface 86A of the cylindrical portion 86 come into contact with each other. Hence, the distance can be adjusted by appropriately setting a length of the cylindrical portion 86. Each high-pressure vessel 12 and the support members 80 are also movable in a direction orthogonal to the axial direction within the elastically deformable range of the coil spring 88.

Fourth Embodiment

Finally, a high-pressure vessel mounting structure 10 according to a fourth embodiment will be described. Note that equivalent parts to those in the first embodiment will be denoted by the same numerals, and detailed description (including a common action) will be omitted as appropriate.

Figure 8:
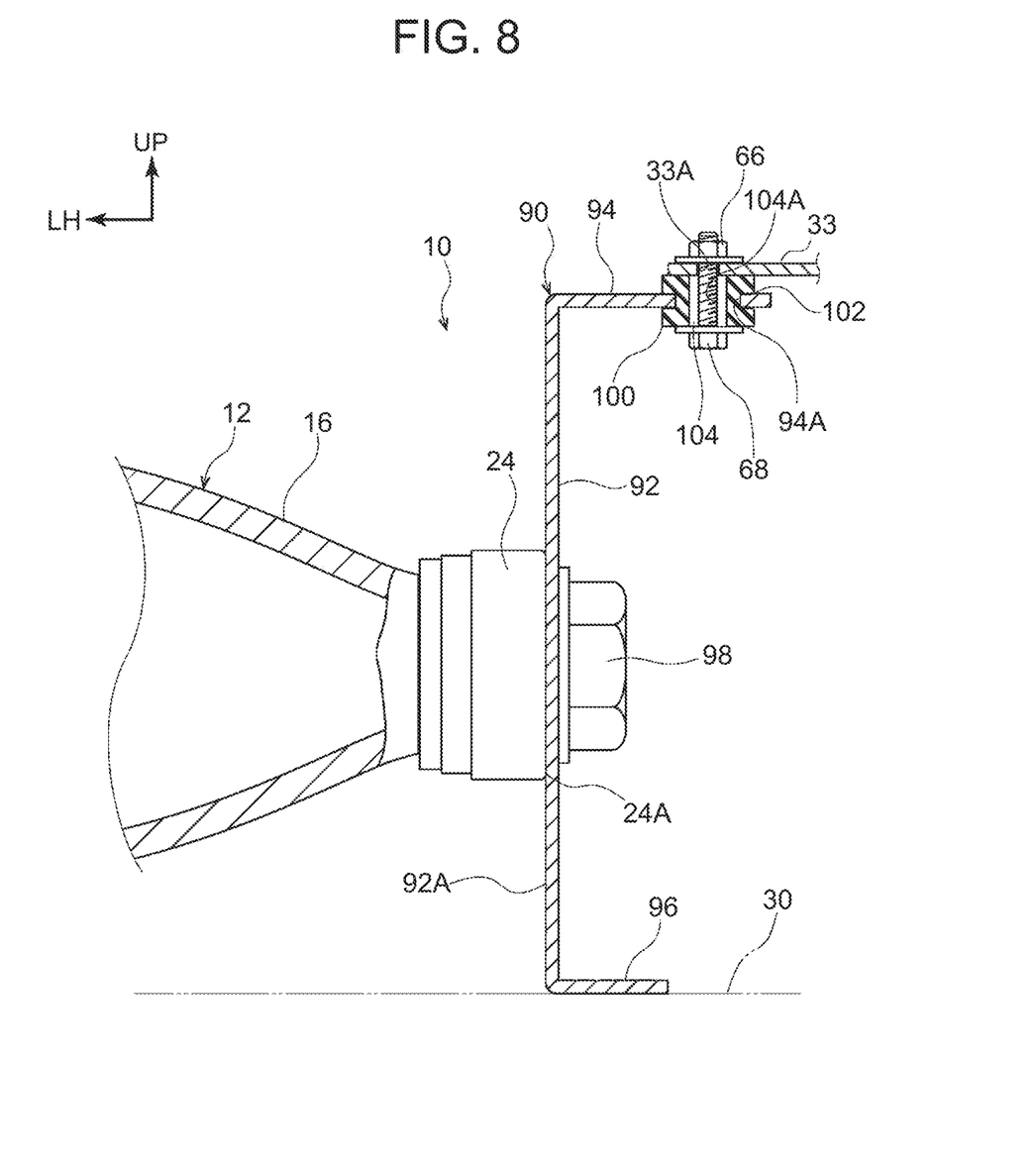
FIG. 8 is a schematic view corresponding to FIG. 5, illustrating a high-pressure vessel mounting structure according to a fourth embodiment.

As illustrated in FIG. 8, a support member 90 according to the fourth embodiment is made up of a substantially flat sidewall 92, an upper protrusion 94 integrally protruding outward in the vehicle width direction at an upper end (one end) of the sidewall 92, and a lower protrusion 96 integrally protruding outward in the vehicle width direction at a lower end of the sidewall 92.

A plurality of circular through-holes (not illustrated) are formed along the front-rear direction at appropriate positions of the sidewall 92. In the fourth embodiment, although not illustrated, a height of the outer end face (right end face) 54R of each reinforcement 50 in the vehicle width direction is set to be higher than a position of the cap 24 of each high-pressure vessel 12 disposed on the undercover 30.

Meanwhile, a female screw portion (not illustrated) having the same diameter as an inner diameter of the through-hole formed in the sidewall 92 is formed at an axial center of the cap 24 provided at the right end of each high-pressure vessel 12. Thus, each bolt 98 is inserted into each through-hole from outside in the vehicle width direction and screwed to each female screw portion, with the outer surface 24A of each cap 24 in contact with an inner wall surface 92A of the sidewall 92, whereby each high-pressure vessel 12 is fixed to the sidewall 92.

A plurality of circular through-holes 94A are formed in the front-rear direction at a tip of the upper protrusion 94 in a protruding direction, and a cylindrical rubber member 100 having an outer diameter larger than an inner diameter of the through-hole 94A is inserted and attached to each through-hole 94A. More specifically, a slit 102 is formed at an axial center of an outer peripheral surface of each rubber member 100, and a peripheral edge of each through-hole 94A is inserted into the slit 102, whereby each rubber member 100 is held immovably at the tip of the upper protrusion 94 in the protruding direction.

The upper protrusion 94 is attached to a tip of a protrusion 33 in a protruding direction via each rubber member 100 by fixing means such as bolt-fastening, the protrusion 33 protruding inward in the vehicle width direction from an upper end of the vertical wall portion 32B of the energy-absorbing member 32R. A plurality of circular through-holes 33A are formed along the front-rear direction at the tip of the protrusion 33 in the protruding direction. A cylindrical collar member 104 having an axial length equal to an axial length of the rubber member 100 is inserted in the through-hole of each rubber member 100.

Thus, each bolt 68 is inserted into a through-hole 104A of the collar member 104 and the through-hole 33A of the protrusion 33 from below and screwed to each nut 66, whereby the upper protrusion 94 is attached to the protrusion 33. As a result, the support member 90 is held by the energy-absorbing member 32R via the rubber member 100.

For this reason, when a collision load is input from the left, each high-pressure vessel 12 can move (slide) rightward due to elastic deformation of the sidewall 92 and the rubber members 100 (via the upper protrusion 94). In other words, the support members 90 can move relatively leftward with respect to each high-pressure vessel 12 due to the elastic deformation of the sidewalls 92 and each rubber member 100.

Accordingly, when a collision load is input from the left, the manifold 20 can move inward in the vehicle width direction (rightward) together with the left energy-absorbing member 32L, and the inner wall surface 20A of the manifold 20 can be brought into contact with an outer end face (left end face) 54L of each reinforcement 50 in the vehicle width direction.

When a collision load is input from the right, each rubber member 100 and an upper side of the sidewall 92 elastically deform, so that the support members 90 can move in the obliquely lower-left direction (leftward) with respect to the high-pressure vessels 12. Accordingly, when a collision load is input from the right, the support member 90 can move inward in the vehicle width direction (leftward) together with the right energy-absorbing member 32R, and the upper inner wall surface 92A on the sidewall 92 of the support member 90 can be brought into contact with the outer end face (right end face) 54R of each reinforcement 50 having a larger height in the vehicle width direction.

While the high-pressure vessel mounting structure 10 according to the present embodiment has been described with reference to the drawings, the high-pressure vessel mounting structure 10 according to the present embodiment is not limited to the one illustrated in the drawings but can be appropriately modified in design within a scope not deviating from the gist of the disclosure. For example, the number of high-pressure vessels 12 is not limited to the number illustrated in the drawing.

The tubular member in the second embodiment is not limited to the cylindrical member 78. For example, when the cap 24 is formed in a polygonal shape in a side view, the tubular member is formed in a shape matching the polygonal shape. Further, the vehicle body constituting member in the present embodiment is not limited to the energy-absorbing member 32.

What is claimed is:

1. A high-pressure vessel mounting structure comprising:
    a plurality of high-pressure vessels arranged on an upper surface of a bottom wall in a front-rear direction of a vehicle body with a vehicle width direction as an axial direction;
    a plurality of load transmission members each provided between the high-pressure vessels on the bottom wall and extending along the axial direction;
    a connection member that connects one axial end of each of the high-pressure vessels; and
    a support member that supports the other axial end of each of the high-pressure vessels, wherein,
    the support member is able to move relatively inward in the vehicle width direction with respect to the high-pressure vessel when a load is input from outside in the vehicle width direction, wherein the support member holds an outer peripheral surface of a rubber member fitted to the other axial end of the high-pressure vessel, and a gap is formed between an outer end face of each reinforcement in the vehicle width direction and an inside wall surface of the support member in the vehicle width direction.

* * * * *